Figure 1:
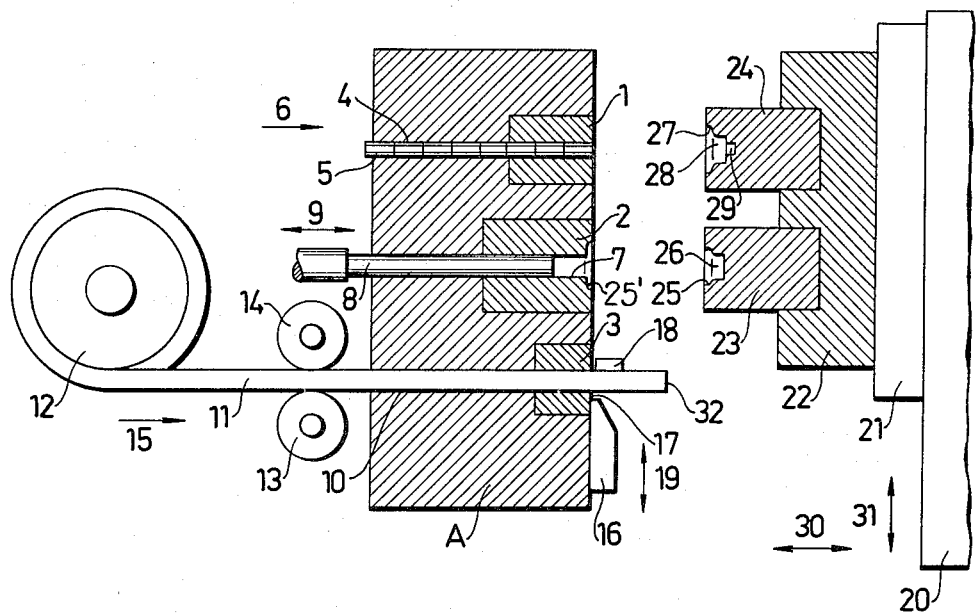

United States Patent
Lejdegard

[15] 3,680,195
[45] Aug. 1, 1972

[54] METHOD PARTICULARLY FOR MAKING STUDS FOR VEHICLE TIRES AND THE LIKE

[72] Inventor: Sixten Harald Lejdegard, Hallstahammar, Sweden

[73] Assignee: Bultfabriks Aktiebolaget, Hallstahammar, Sweden

[22] Filed: Dec. 12, 1969

[21] Appl. No.: 884,760

[30] Foreign Application Priority Data

Dec. 16, 1968 Sweden.....................17204/68

[52] U.S. Cl. .....................29/432.1, 29/505, 29/520, 29/525, 152/210
[51] Int. Cl. .............................................B23p 11/00
[58] Field of Search..........29/432.1, 432, 432.2, 525, 29/505, 520; 152/210

[56] References Cited

UNITED STATES PATENTS

| | | | |
|---|---|---|---|
| 2,318,326 | 5/1943 | Padley et al. | 29/505 UX |
| 3,098,022 | 7/1963 | Karnie | 29/520 X |
| 3,125,147 | 3/1964 | Hakka | 152/210 |
| 3,186,466 | 6/1965 | Keinanen | 29/212 T UX |
| 3,408,730 | 11/1968 | Anderson | 29/505 |

Primary Examiner—Charlie T. Moon
Attorney—Robert E. Burns and Emmanuel J. Lobato

[57] ABSTRACT

A method of fixing a pin of harder material in a body of softer material to produce anti-skid tire studs comprises placing a cylindrical blank of the softer material in a first die having a cylindrical bore with a flared opening and a spindle reciprocable in the bore moving toward the first die in a direction axial of the bore a second die having a recess of larger diameter than the bore to form locally an annular enlargement of said blank, removing the second die while leaving the partially formed blank in the first die and thereafter moving toward the first die in a direction axial of the bore a third die having a pin of said harder material positioned axially therein and an annular recess surrounding said pin to press the pin into the partially formed blank and produce flow of said softer material radially into said recess to form a stud having the pin of harder material in one end of a body of softer material having an annular flange intermediate its ends. A head is thereafter formed on the end of the stud opposite the pin.

6 Claims, 8 Drawing Figures

METHOD PARTICULARLY FOR MAKING STUDS FOR VEHICLE TIRES AND THE LIKE

The types of hard metal armored tire studs for vehicle tires available in the market are generally made in such a manner that the hard metal pins included in the studs are fitted into a hole of a prefabricated stud body. The hard metal pins may either be threaded into the stud body, soldered or by friction fit, after being struck into the body, brought to stay in the same. Such a method is extremely expensive from the point of mass production. The present invention has for its object a new improved method of manufacturing the said tire studs and also for making any object in general, where the problem of fixing bodies of a harder metal into bodies of a softer metal arises.

In accordance with the present invention the method is characterized in that the body of the softer material is placed in or provided for cooperation with a mould, the body of the hard material during material flow, in a so called cold extrusion process of the softer material being pressed into the latter in order totally or partly to fill the mould cavity with the extruded softer material, so that the body of the harder material is brought to be fixed into the softer material.

The invention will now be described more in detail with reference to the attached drawing, in which FIGS. 1 to 6 diagrammatically illustrate an arrangement for manufacturing tire studs according to the present invention in various steps of operation, the arrangement being partly shown in section.

Figure 7:
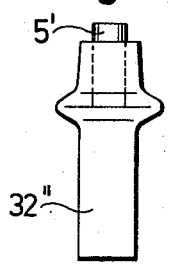

FIG. 7 shows, on a larger scale, a tire stud as it emerges from the arrangement according to FIGS. 1 to 6, and FIG. 8 shows a ready made tire stud after final machining.

The arrangement as illustrated in FIGS. 1 to 6 mainly consists of a machine common in the manufacture of screws, a so called double stroker (although a transfer machine may also be considered) and it comprises a machine base plate A in the one surface of which are inserted three sleeves 1, 2 and 3 spaced from each other. The respective borings of the sleeves align with apertures in the machine base plate, the boring of sleeve 1 forming a passage 4 for hard metal pins 5 which are adapted to be fed in the direction of arrow 6 towards and through sleeve 1, which in the present case may be designated as a magazine. All the sleeves are made of a harder material than the machine base plate A. The boring 7 of sleeve 2 is made mainly to provide a guide to a tailstock spindle 8 to be displaceable in the directions of the double arrow 9. In this connection sleeve 2 is to be regarded as a die. The boring 10 appertaining to sleeve 3 is to provide the guide to a wire material 11 fed through the same. The wire material is supplied from a wire storing roll 12 between the feed rolls 13, 14 in the direction of arrow 15. Taking into account that sleeve 3 cooperates with a cutting blade 16 located slidable along the machine base plate A, the sleeve may in this connection by designated as a cutting die. The cutting blade has a cutting edge 17 and cooperates with a support 18 for the blanks to be cut by the cutting blade, which support is displaceable in the directions of the double arrows 19.

In cooperation with the arrangement described hereinbefore there is provided a pressure slide 20 supporting a cross slide 21 and a pressing member holder 22. The holder supports two pressing members 23, 24 which in the said order, in this connection, may be designated as a rough pressing member and a final pressing member. The rough pressing member is in its surface facing the sleeves provided with conical recesses 25, 26 having different cone angles to achieve a certain basic shape of the stud pin blank to be machined, the opening of sleeve 2 also having a corresponding cavity 25'. The final pressing member 24 is in a similar way provided with recesses 27, 28 and 29. The cross slide 21 and the members 22 to 29 are intended together with the pressure slide 20 to carry out reciprocal movements in the directions of the double arrow 30, while the pressing members 23, 24 together may also move in the directions of the double arrow 31.

Figure 2:
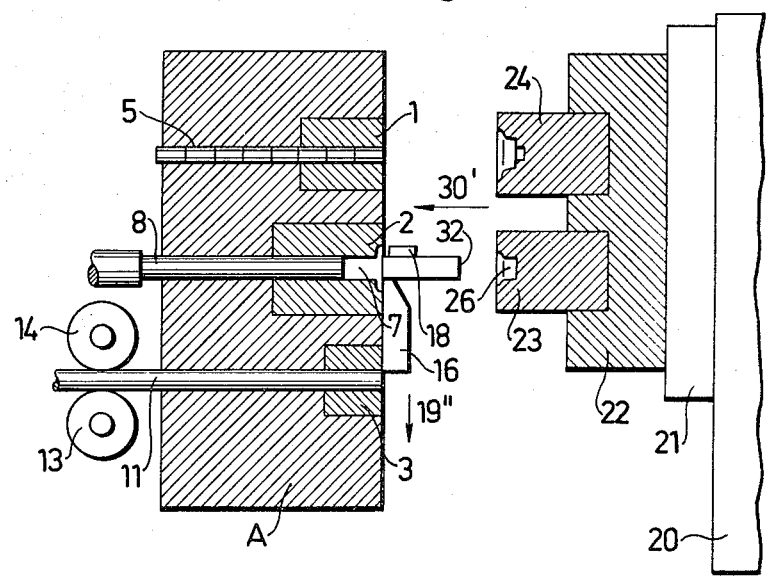
Figure 3:
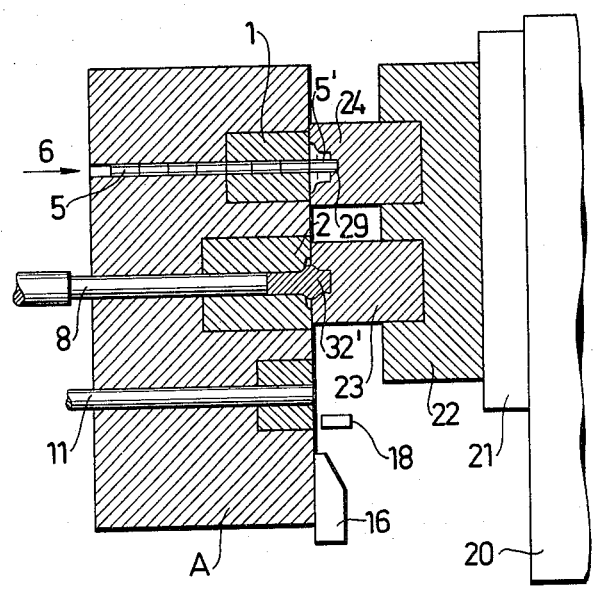

It is assumed that all the means comprised in the arrangement take an initial position as shown in FIG. 1, the wire material 11 being fed a section 32 beyond the cutting die 3 by the rotation of the feed rolls 13, 14. The cutting blade 16 will then be acted on to displace towards the projecting section or piece 32, the support 18 being pushed forward to such a position as to be brought into supporting engagement with piece 32 at the same moment as the edge 17 or the cutting blade 16 starts the cutting operation for cutting off piece 32. The cutting operation being completed the cutting blade 16 continues upwards towards sleeve 2, with the piece 32 resting on edge 17 and support 18. With the piece 32 right opposite the boring 7 of sleeve 2 the cutting blade is stopped, and the movement of the support and its position will be as illustrated in FIG. 2. The pressure slide 20 will then be acted on to be displaced in the direction of arrow 30', so that the bottom of the recess 26 of the rough pressing member 23 will cooperate with the free end of the piece 32, which will thus be displaced into the opening 7 of sleeve 2. As soon as the piece 32 has been pushed in so far as to rest between opening 7 and recess 26, the cutting blade 16 will be operated so as to return in the direction of arrow 19'' to the initial position as shown in FIG. 1, and the support 18 will be withdrawn. The punch 20 and the portions connected thereto continue their movement, the piece 32 being jolted and to some extent pressed into shape between the sleeve 2 serving as a die and the rough pressure member 23, this resulting in a work piece shaped as seen in FIG. 3, and which is here designated 32'. During this whole operational process the tailstock spindle 8 will, of course, be maintained in a fixed position, as will be seen in the figures described. When the pressing members and the portions connected thereto have reached the position shown in FIG. 3 and the piece 32' has been ready machined the row of hard metal pins 5 is acted on in the direction of arrow 6, the extreme pin in the magazine sleeve 1 being pushed into recess 29 in the opposed final pressing member 24. The corresponding pin is to be maintained in the said recess 29 by friction until further action.

Figure 4:
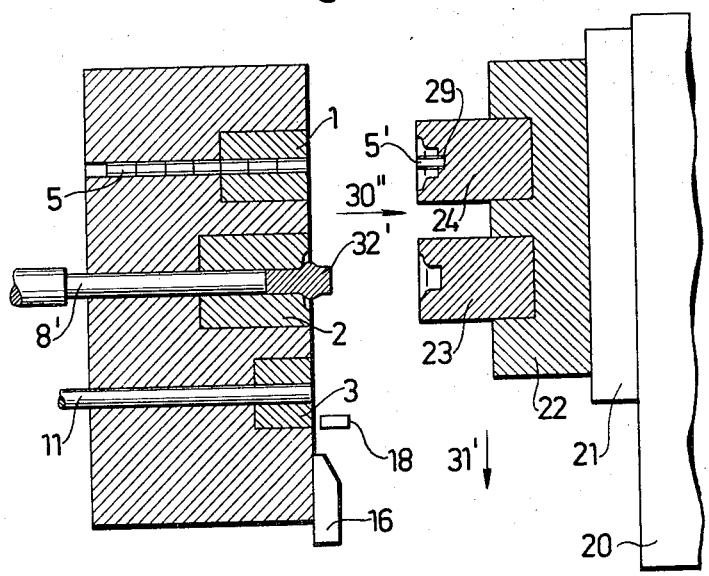
Figure 5:
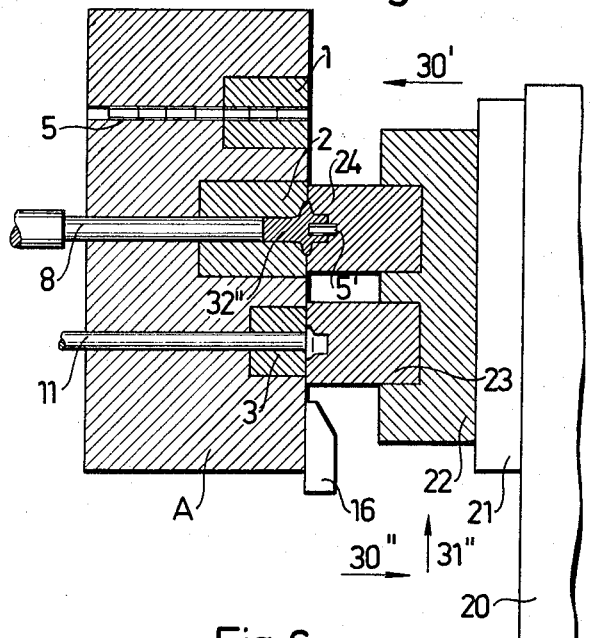
Figure 6:
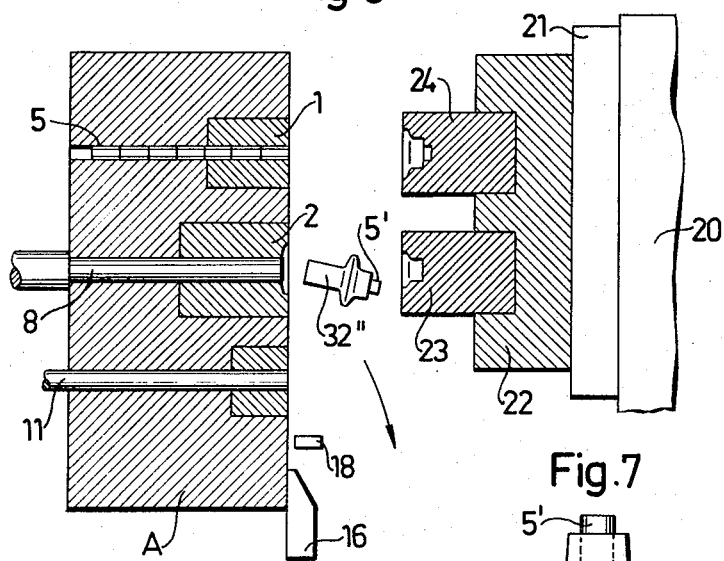

The pressing means and members connected thereto are then operated to be displaced in the direction of arrow 30'', as set forth in FIG. 4. The final pressing member 24 supports, as will be seen, a hard metal pin in its recess 29, while the roughly shaped piece 32' remains in its die as constituted by sleeve 2. The cross slide 21 is then operated to be displaced in the direction of arrow 31'', until the final pressing member 24 will be right opposite sleeve 2 and thus the pin 5 inside the same right opposite the axis of piece 32'. In this position of the slide and pressing member the pressure slide 20 will again be acted on in the direction of arrow 30'. During this movement the hard metal pin 5 in the final pressing member 24 will successively be pushed into the piece 32' during material flow and filling of the recesses 27, 28 of the final pressing member 24, which recesses are larger in dimension than the recesses 25, 26 of the rough pressing member 23. The pressing-in of in a hard metal pin 5 will thus be carried out in spray moulding process, until, as will be seen in FIG. 5, a stud work piece 32' has been obtained. Thus the pin 5' will act as a punch. During the last mentioned operation there will not only be material flow forces acting in a direction of the hard metal pin punch 5' but also radial forces which during the filling up action in the mould cavity will act on the pin side wall in a clamping fashion so that the pin will be firmly connected to the piece 32'. During the whole operation the tailstock spindle 8 is again kept in its fixed position as mentioned hereinbefore. The hard metal pin 5 has now firmly been brought into its position in the stud work piece 32" thus shaped. As illustrated by FIG. 5 the pressing member 23 will in the latter operation go right up to sleeve 3 without carrying out any further operation. When the pressure slide is operated to return in the direction of arrow 30" and thereafter the cross slide in the direction of arrow 31" to the initial position, as shown in FIG. 1, the stud work piece 32' will remain in sleeve 2. The tailstock spindle 8 is then displaced in the direction of arrow 9', as will be seen in FIG. 6, the stud piece 32" being pushed out of sleeve 2 and being allowed to fall freely down into a magazine, the tailstock spindle 8 returning to its initial position. The machine is now ready for a new cycle of operations after feeding out wiring material 11 to a piece 32, as shown in FIG. 1.

Figure 8:
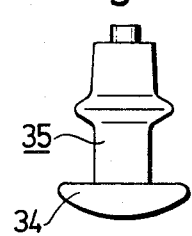

In FIG. 7 the stud piece 32' with its hard metal pin 5' is shown on a larger scale. To make the stud piece usable as a tire stud still another operation is required. This operation is known in prior art and involves a cold upsetting of the stud piece 32", so that an anchoring head 34 is formed as shown in FIG. 8 for fixing the now completed stud 35 in the tire of a vehicle.

The operational processes as described hereinbefore are naturally carried out in a very fast rhythm. By the favorable manufacturing process as described hereinbefore it is, for example, possible to mass produce tire studs at comparatively low costs and with a very high degree of precision.

The present invention may evidently also be employed for producing other objects than tire studs. If the problem is to fix a body of a harder material into a body of a softer material, the present invention is applicable. In those cases in which a particularly high anchoring effect is aspired to attach the body of the harder material to the softer material, the body of the harder material may, for example, be provided with barbed hooks, pinched-in sections or the like in the surface cooperating with the softer material. The latter measure may also be contemplated when making tire studs for vehicle tires, in particular if these are of large dimension intended to be used on heavy vehicles.

I claim:

1. A method for fixing a body of harder material in a body of softer material, particularly for the production of anti-skid elements, comprising the steps of:

placing a cut-off soft material rod shaped blank in position for forming in a first die cooperating with a second die, the forming surfaces of said dies having laterally extending cavities around said blank; forming the body between said die surfaces in a first step so as to let the blank flow into and partially occupy said lateral cavities; removing said second die and leaving the partially shaped blank in position in the first die; bringing a third die in operative alignment with the first die, said third die having said hard body received therein in axial alignment and having laterally extending cavities around said hard body corresponding to the cavities of the first die; moving said first and third dies together whereby the hard body is entered into the partially shaped soft body blank portion causing the soft material to flow laterally and axially in cold extrusion to fill said cavities and secure the hard body embedded within the soft body through cold extrusion pressure forces.

2. A method according to claim 1, further comprising upsetting the end of said blank opposite said hard body to form a head thereon.

3. A method of fixing a body of harder material in a body of softer material, particularly for the production of anti-skid tire studs, comprising the steps of:

shearing a length of said softer material from a rod of said material to provide a substantially cylindrical blank, positioning said blank in axial alignment with a die having a cylindrical bore and a spindle reciprocable therein, moving toward said first die axially of said bore a second die having a cavity in alignment with said bore and an annular recess of larger diameter than said cavity to press said blank in said bore against said spindle in retracted position and produce flow of said material into said cavity and recess to form locally an annular enlargement of said blank, removing said second die while leaving said formed blank in the bore of said first die, moving toward said first die axially of said bore a third die having a pin of said harder material, of smaller diameter than said blank, positioned in a recess in axial alignment with said bore and an annular recess of larger diameter than said annular recess of said second die surrounding said pin to press said pin axially into said formed blank and thereby produce flow of said softer material radially into said annular recess of said third die to form a stud having said pin in one end of a body of said softer material and an annular flange intermediate the ends of said body, removing said third die and moving said spindle in a direction toward said third die to eject said stud from said bore.

4. A method according to claim 7, in which said first die is provided with an annular recess at the outer end of said bore and said softer material is expanded radially into said recess.

5. A method according to claim 3, further comprising upsetting the end of said blank opposite said pin to form an enlarged head thereon.

6. A method according to claim 3, in which said second die is provided with a recess having inner and outer frusto-conical portions of different cone angles, a portion of said blank being expanded radially to fill said recesses.

* * * * *

UNITED STATES PATENT OFFICE
CERTIFICATE OF CORRECTION

Patent No. 3,680,195　　　　　　　　Dated August 1, 1972

Inventor(s) Sixten Harald LEJDEGARD

It is certified that error appears in the above-identified patent and that said Letters Patent are hereby corrected as shown below:

On the title page, in column 1, change the name of the assignee from BULTFABRIKS AKTIEBOLAGET to BULTEN-KANTHAL AKTIEBOLAG.

Signed and sealed this 8th day of May 1973.

(SEAL)
Attest:

EDWARD M. FLETCHER, JR.　　　　ROBERT GOTTSCHALK
Attesting Officer　　　　　　　Commissioner of Patents